Aug. 4, 1925.
F. E. HANCOCK
1,548,525
GEAR SHIFT LOCK
Filed March 15, 1923    3 Sheets-Sheet 3
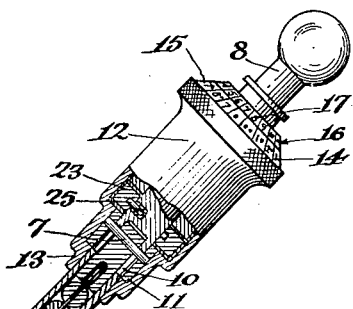
Fig.10.
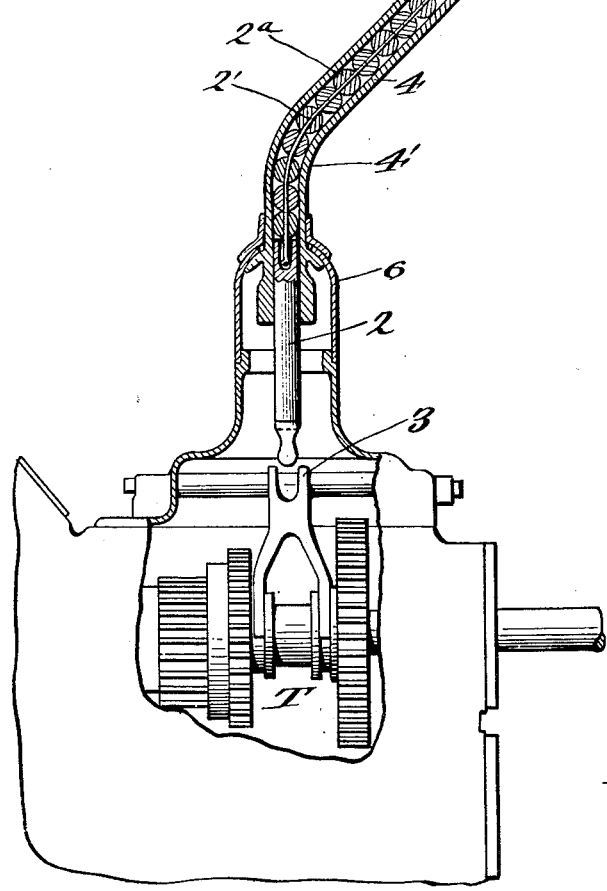
Inventor:
Frank E. Hancock.
By Hazard and Miller
Attorneys.

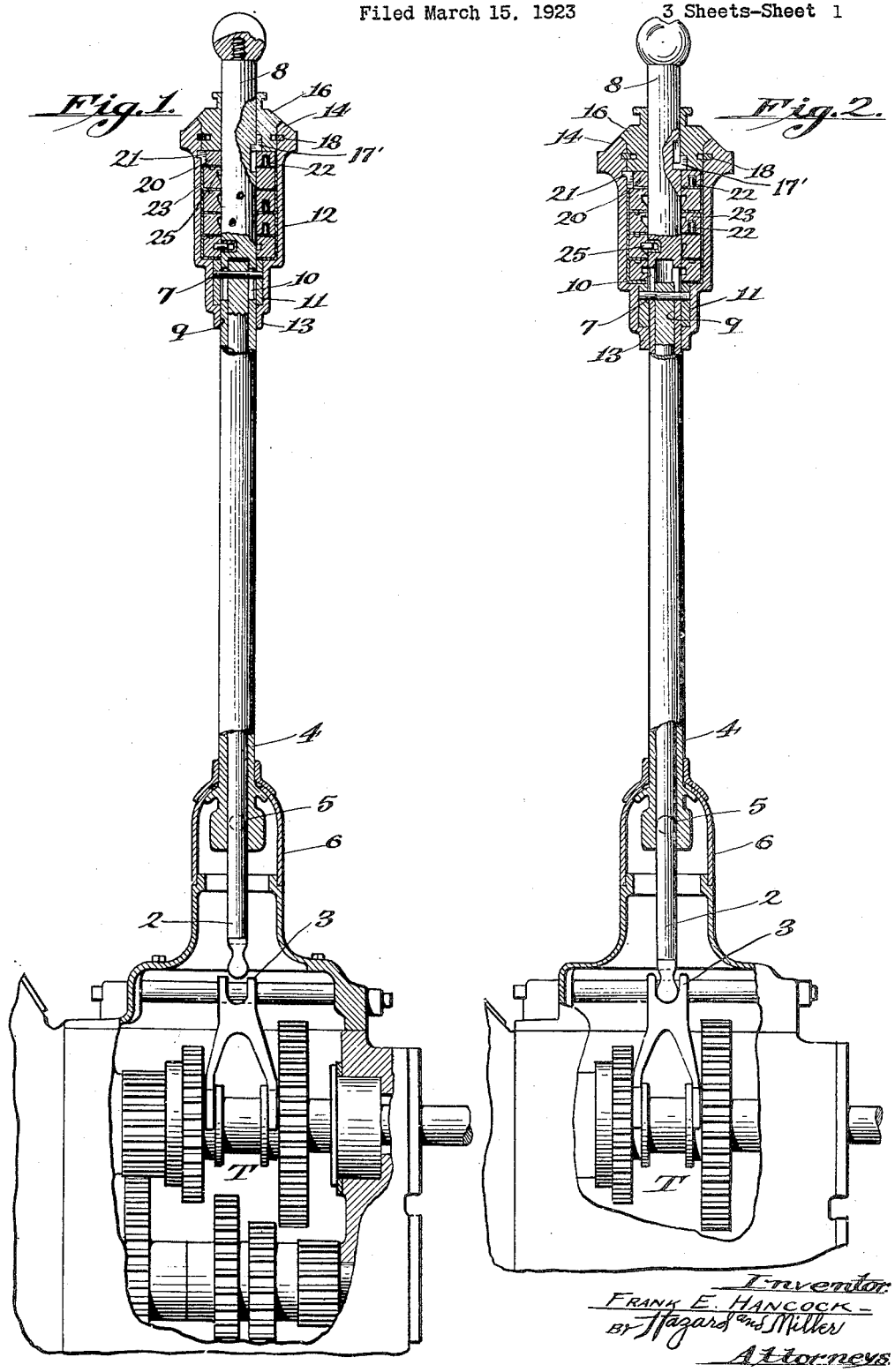

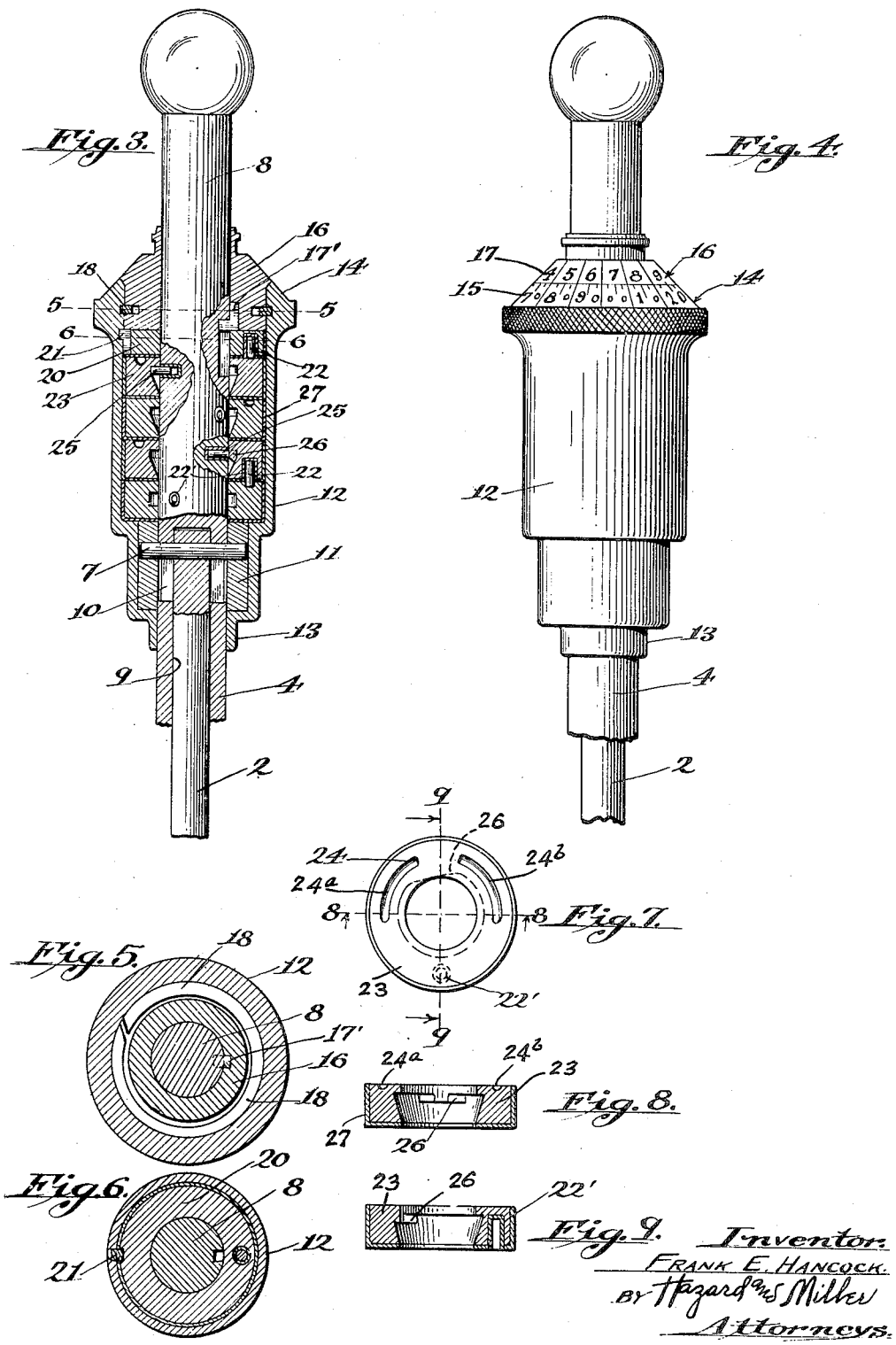

Patented Aug. 4, 1925.

1,548,525

UNITED STATES PATENT OFFICE.

FRANK E. HANCOCK, OF SANTA MONICA, CALIFORNIA.

GEAR-SHIFT LOCK.

Application filed March 15, 1923. Serial No. 625,182.

*To all whom it may concern:*

Be it known that I, FRANK E. HANCOCK, a citizen of the United States, residing at Santa Monica, in the county of Los Angeles and State of California, have invented new and useful Improvements in Gear-Shift Locks, of which the following is a specification.

This invention relates to automobile accessories and equipment, and more particularly to automobile locks. An object of the present invention is to provide an improved gear shift lock.

Another object is to provide a gear shift lock that may be readily applied to standard forms of gear shift mechanisms of automobiles.

Another object of the invention is to provide a keyless gear shift lock mechanism.

Other objects and advantages will be made manifest in the following specification of an embodiment of the invention illustrated in the accompanying drawings, wherein Figure 1 is a vertical section and elevational view of the improved device showing the lock elements in shift-preventing position.

Fig. 2 is a sectional detail view showing the parts in gear shift connecting position.

Fig. 3 is a detail sectional view of the lock mechanism.

Fig. 4 is a side elevation of the upper end of the gear shift lever and the lock.

Fig. 5 is a cross section on line 5—5 of Figure 3.

Fig. 6 is a cross section on line 6—6 of Figure 3.

Fig. 7 is a plan of one of the tumblers.

Fig. 8 is a cross section on line 8—8 of Figure 7.

Fig. 9 is a cross section on line 9—9 of Figure 7.

Fig. 10 is a side elevation and sectional view showing a modified form of the shift lever connecting element.

The present invention is shown as combined with a conventional form of speed changing transmission gears generally indicated at T, the gears of this mechanism being adapted to be rendered effective and shiftable when a connecting bolt 2 is interlocked in a complementary keeper 3 which actuates the sliding gear set.

The invention consists of means for setting and retracting the connecting bolt 2 and for locking the bolt in retracted or disconnected position and thereby prevent unlicensed or unauthorized operation of the gears.

The bolt 2 is shown as being slidably mounted in tubular lever 4, which may be pivotally mounted at 5 on a cap 6 forming a part of the transmission box. The upper end of the bolt 2 is provided with a cross pin 7 passing through a shank 8, the lower end of which may be chambered at 9 to receive the bolt 2, the shank preferably forming the upper end of the lever 4. The lever shank is provided with opposite slots 10 through which the pin 7 projects, and on the ends of the pin is mounted a collar 11 which slides on the lever shank.

The collar 11 is encased by the lower end of a cylindrical shell 12 having a contracted hub 13 turnably fitting on the upper end of the lever 4. The shell 12 is provided with a graduated ring or face 14, which may have index members 15. The upper end of the shell is closed by a plug 16 which is keyed at 17' to the shank 8 of the shift lever 4 and is provided with an indexed graduated face 17 coordinate to the index 14 of the shell.

The shell 12 is rotatively mounted as to the plug 16 and is retained in combination therewith as by an expansion or spring ring 18 mounted in opposed grooves provided therefor in the meeting faces of the hub and the shell.

Below the plug 16 and within the shell 12 there is formed a tumbler chamber, and in this there is arranged a suitable tumbler mechanism including, for instance, a master disk 20 which is keyed at 21 to the shell and is provided in its lower face with a pin 22 designed to move downwardly into either of a pair of grooves 24$^a$ or 24$^b$ provided therefor in the top face of the next lower disk tumbler 23, so that when the pin 22 is in abutting engagement with the shoulder 24, Figure 7, at the end of one of the grooves, the tumbler 23 can be rotated by rotation of the shell 12. There is provided a plurality of tumblers similar to tumbler 23, which are adapted to be relatively locked to the shell by the locking pins 22, so that, by a proper manipulation of the several disks by rotation of the shell 12, certain locking pins 25, which are slidably mounted radially in the lever shank 8, can all be pressed inwardly so as to provide for a longitudinal sliding movement of the shell with the tumblers on the shank. The several tumblers are provided with cam faces 26 having high spots which, when registered with the locking pins 25, hold the pins in innermost positions and thus disconnect the lever shank from the several tumblers; the cam faces 26 being positioned by relative rotation of the tumblers 23 and which positions are determined according to a given combination. To effect the combination the shell 12 is rotated in one direction or the other, according to a given index formula, the several positions of the shell being determined by the registering of the combination dials 15 and 17 on the lock.

When the locking pins 25 have been thrust into their innermost positions, the shell 12 with the disks unlocked, can be bodily shifted upwardly along the shank 8, and with this movement the pin 7 serves to pull the locking bolt 2 upwardly to the position shown in Figure 1, at which time it will be disengaged from the keeper or connecting device 3 with the result that the gear shift mechanism will be rendered inoperative.

When the combination lock above described has been manipulated and the locking bolt 2 withdrawn, it will be seen that operation of the transmission mechanism is rendered impossible, and in order to connect the shift lever and the transmission it is necessary to again manipulate the lock so as to permit the downward movement of the shift lever locking bolt 2 to engage the transmission, after which the transmission can be actuated in the usual manner.

A feature of the invention is to provide means for eliminating springs in a combination lock. The shank 8 together with the tumblers 23, the master tumbler 20 and the pins 22 and 25 are all magnetized. The connecting pins 22 are housed within the tumblers 23 and are surrounded by jackets 22' of copper, bronze or similar non-magnetic material. The pins 25 are also provided with jackets designated at 22' in Fig. 3, of similar non-magnetic material disposed within the shank 8.

The operation of the device is as follows: In order to lift the bolt 2, the shell 12 is rotated and in this case where four tumblers are used, it is necessary to give the shell 12 four complete revolutions. Upon the first revolution, the pin 22, disposed within the master tumbler 20, is drawn into engagement with the uppermost tumbler 23 by means of the magnetism of the uppermost tumbler. It is seen that by providing the pin 22 with a jacket of non-magnetic material, the attraction of this pin to the tumbler 23 will be greater than toward the master tumbler 20. This pin 22 is drawn towards the tumbler 23 and upon rotation engages the shoulder 24, causing the uppermost tumbler 23 to rotate with the shell 12. By continuing to rotate, the pin within the uppermost tumbler 23 will be drawn towards the subjacent tumbler 23 by means of its magnetism and will engage a corresponding shoulder 24. When all of the tumblers are connected by means of the pin 22, the lowermost tumbler 23 may be set according to a number disposed upon a dial which will of course press the pin 25 into the shank 8. The shell may then be rotated in the opposite direction and the pin 22, which was previously engaging the shoulder 24 in the slot 24$^a$, will be caused to rise because of the fact that the grooves 24$^a$ and 24$^b$ have downwardly slanting bottoms, that is, the end of the groove opposite the shoulder 24 is substantially flush with the upper surface of the tumbler.

The shell upon being rotated in the opposite direction from that in which it was initially rotated in order to engage all of the tumblers, will cause the pin 22 to engage the shoulder of the groove 24$^b$ and cause its rotation in the opposite direction, whereby it may be set according to the dial. In a like manner all of the tumblers may be set by means of rotating the shell 12 first in one direction and then in the other, and the pins 25 of each tumbler will be caused to be pressed into the shank 8 by the cam faces 26, whereby the shell may be bodily lifted together with the tumblers and with the bolt 2.

To lock the lock it is merely necessary to give the shell 12 a turn, which will displace one or more of the cam faces 26 away from the ends of the pins 25. Because of the fact that the tumblers are magnetized, the pins 25 will be withdrawn from their non-magnetic jackets 22' within the shank 8 and will prevent axial movement of the shell 12.

Each tumbler 23 is provided with a casing 27, also of non-magnetic material, which will reduce the magnetic attraction between the respective tumblers. By having this magnetic attraction reduced, the lowermost tumbler, when it is once set, will tend to stay set because of friction and also because of the magnetic attraction of the tumbler for the magnetized shank 8 and will permit the tumblers 23 thereabove to be turned without rotating such bottom tumbler 23.

In Figure 10, there is shown a construction in which the locking plunger 2 is connected by flexible means to the pin 7, since the shift lever 4 is provided with a bend 4' and necessitates a jointed or flexible medium capable of moving longitudinally in the bend. The flexible device may comprise a core wire 2' upon which may be threaded a series of balls 2$^a$. This construction provides for the longitudinal movement of the plunger 2 as the lock shell is slipped up or down in the hollow lever 4.

Further embodiments, modifications and variations may be resorted to within the principle of the invention.

What is claimed is:

1. In a rotary tumbler, combination, keyless lock, a set of tumblers and tumbler connecting pins, said pins being magnetically effected and being movable under magnetic influence to the effective position.

2. In a key-less combination lock, a set of movable tumblers and tumbler connecting pins, said pins being operative under magnetic action in their effective movements.

3. In a key-less combination lock, a set of movable tumblers and tumbler connecting pins, said pins being operative under magnetic action in their effective movements, the pins being of magnetic material and the tumblers being magnetized so as to exert an attracting action on the said pins.

4. In a keyless combination lock, a primary part, a set of movable tumblers and tumbler connecting pins associated with said primary part, said pins being operative under magnetic action in their effective movements, and locking pins slidably mounted in said primary part and being magnetically actuated in movement in one direction.

5. In a keyless combination lock, a plurality of magnetic tumblers and means actuated under the magnetism of said tumblers for preventing movement of said tumblers relatively to each other in one direction.

6. In a combination lock, a plurality of magnetic tumblers, pins housed within said tumblers, said pins adapted to be actuated under the magnetism of said tumblers preventing movement of said tumblers relatively to each other in one direction.

7. In a combination lock, a primary part, a plurality of magnetic tumblers associated with said primary part, means actuated under the magnetism of said tumblers for locking said tumblers together against relative rotation in one direction, and means actuated under the magnetism of said tumblers for preventing movement of said tumblers relatively to said primary part in one direction.

8. A combination lock comprising a primary part, tumblers disposed about said primary part, a shell disposed about said tumblers, said shell and tumblers being movable axially upon said primary part, and means for locking said tumblers against axial movement upon said primary part.

9. A combination lock comprising a primary part, tumblers disposed about said primary part, a shell disposed about said tumblers, said shell and tumblers being movable axially upon said primary part, and magnetic means for locking said tumblers against axial movement upon said primary part.

10. A combination lock comprising a primary part, a sliding bolt disposed within said primary part, tumblers associated with said primary part and movable axially thereon, means for connecting said tumblers to said sliding bolt, and magnetic means for locking said tumblers against axial movement upon said primary part.

11. A combination lock comprising a primary part, a shell disposed about said primary part and movable axially thereon, a sliding bolt connected to said shell, tumblers disposed within said shell and engaging said primary part, magnetic means for locking said tumblers against relative rotation in one direction, and means for locking said tumblers against axial movement upon said primary part.

12. A keyless combination lock comprising a primary part and magnetic tumblers engaging said primary part.

In testimony whereof I have signed my name to this specification.

FRANK E. HANCOCK.